US009479246B2

(12) United States Patent
Park

(10) Patent No.: US 9,479,246 B2
(45) Date of Patent: Oct. 25, 2016

(54) METHODS AND ARRANGEMENTS TO ACKNOWLEDGE FRAGMENTED FRAMES

(71) Applicant: Intel Corporation, Santa Clara, CA (US)

(72) Inventor: Minyoung Park, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 327 days.

(21) Appl. No.: 14/142,790

(22) Filed: Dec. 28, 2013

(65) Prior Publication Data

US 2015/0055639 A1    Feb. 26, 2015

Related U.S. Application Data

(60) Provisional application No. 61/869,055, filed on Aug. 22, 2013.

(51) Int. Cl.
*H04W 4/00* (2009.01)
*H04B 7/26* (2006.01)

(52) U.S. Cl.
CPC .................. *H04B 7/2612* (2013.01)

(58) Field of Classification Search
CPC .................................... H04B 7/7612
USPC ......................................... 370/338
See application file for complete search history.

(56) References Cited

U.S. PATENT DOCUMENTS

2006/0107166 A1* 5/2006 Nanda .................. H04B 7/0417
714/748
2013/0223345 A1* 8/2013 Asterjadhi ............. H04L 69/04
370/328

OTHER PUBLICATIONS

IEEE, "Wireless LAN Medium Access Control (MAC) and Physical layer (PHY) Specifications", IEEE Standard for Information technology—Telecommunications and information exchange between system Local and metropolitin area networks-Specific requirments, IEEE std 802.11, Mar. 29, 2012, pp. 1-2793.

* cited by examiner

*Primary Examiner* — Wei Zhao
(74) *Attorney, Agent, or Firm* — Shichrur & Co.

(57) ABSTRACT

Logic for communications with an efficient acknowledgement (ACK) procedure for fragmented frames. Logic may determine an acknowledgement protocol to handle more fragments of a frame than the maximum that can be included in a bitmap of an NDP (null data packet) block acknowledgement (BlockACK). Logic may determine fragment indices to associate with an implicit ACK policy. Logic may read the Fragment Number field value in the Sequence Control field of a data frame to determine the fragment index. Logic may transmit an NDP BlockACK frame for every X fragments with fragment indices greater than X-1 so that L NDP BlockACK frames can acknowledge N fragmented frames. Logic may determine a bit number in a bitmap associated with a fragment index.

33 Claims, 6 Drawing Sheets

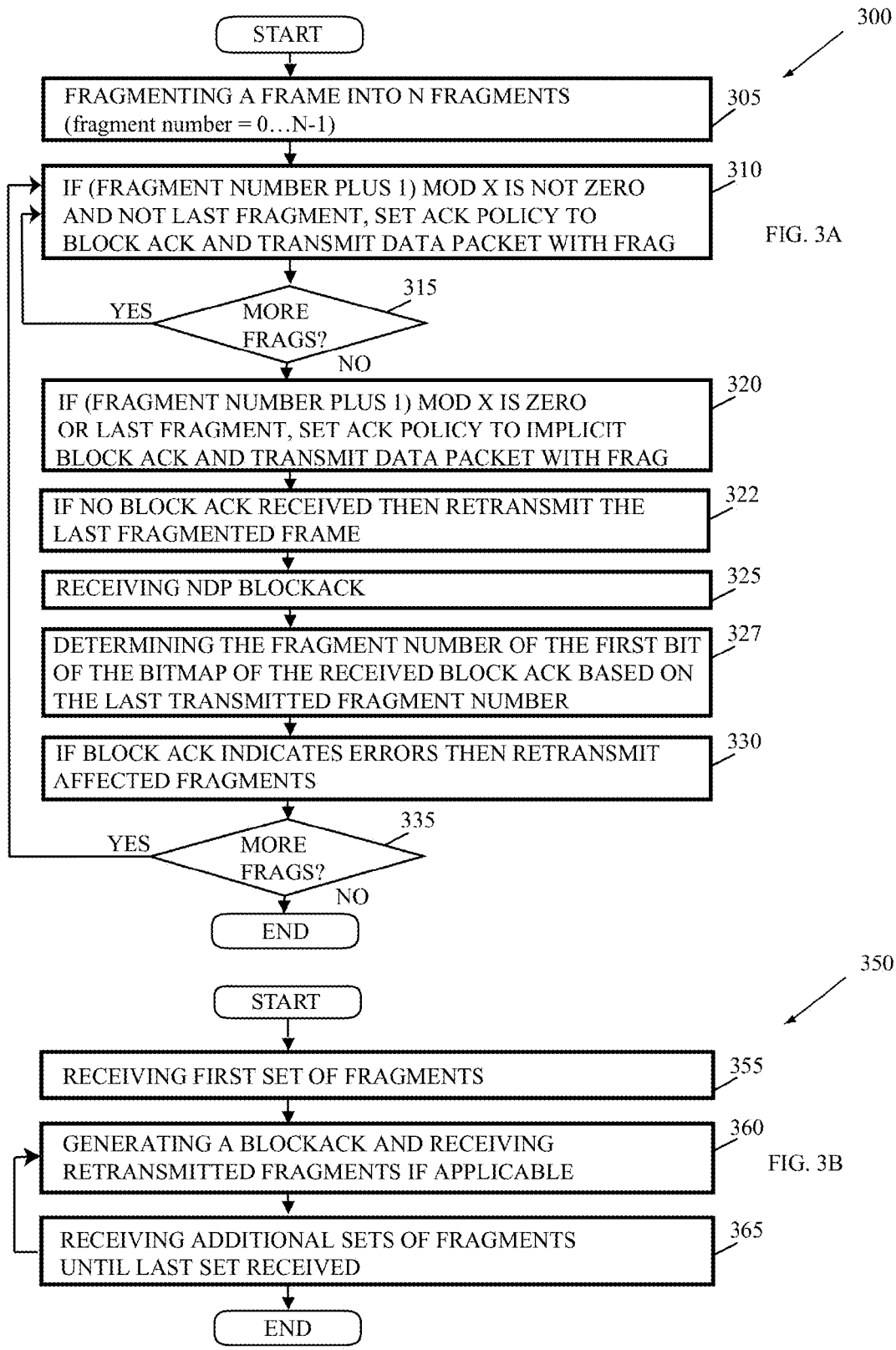

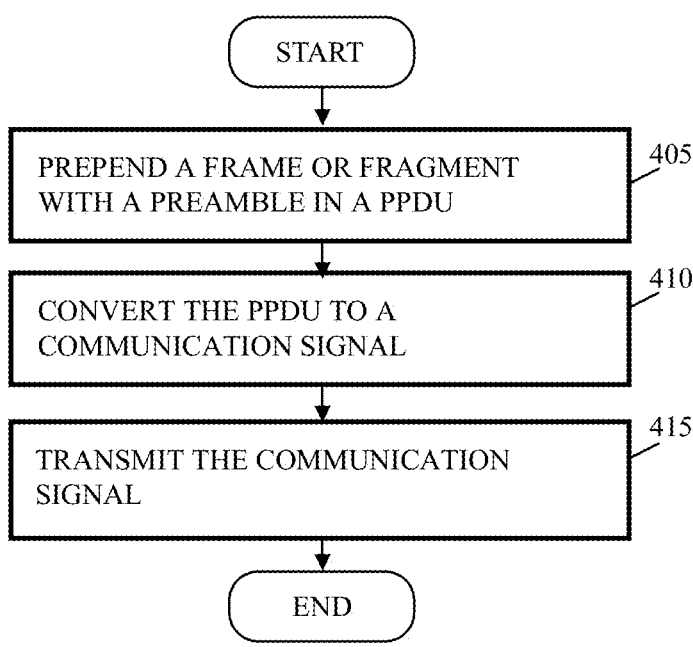

ated with a MAC header that may introduce significant overhead, particularly for a shorter payload, or MAC protocol data unit (MPDU). For example, IEEE 802.11ah systems may support 1 MHz channel bandwidth and the lowest supported physical layer (PHY) data rate may be 150 kilobits per second (Kbps). Such IEEE 802.11ah systems may offer a much longer transmission range but, at the same time, increase durations of packet transmissions. For a 1500 Byte packet, for instance, the transmission duration may be about 80 milliseconds (ms), which is too long for one packet to occupy the communication medium. Therefore, for such a big packet, an IEEE 802.11ah station may fragment the packet and send the packet in multiple packets with fragmented frames.

METHODS AND ARRANGEMENTS TO ACKNOWLEDGE FRAGMENTED FRAMES

TECHNICAL FIELD

The present disclosure relates generally to the field of wireless communications technologies. More particularly, the present disclosure relates to improving the acknowledgement procedure for fragmented frames in a wireless network such as an IEEE 802.11ah network.

BACKGROUND

The Institute of Electrical and Electronic Engineers (IEEE) 802.11 systems typically use a media access control (MAC) frame format to convey control information and data. In some situations, a transmitter may transmit such a large amount of data that it is infeasible to transmit in a single data packet. In such situations, the transmitter may divide the data into fragments and transmit the fragments, or fragmented frames, to a receiver in separate packets.

While transmitting the fragments of data to a receiver, it may not be efficient to wait for a response between the transmission of each packet so many IEEE 802.11 systems implement a Block Acknowledgement (BlockACK) policy that allows the receiver to acknowledge receipt of more than one of the packets in a single acknowledgement response.

BRIEF DESCRIPTION OF THE DRAWINGS

FIG. 3A depicts an embodiment of a flowchart transmission of fragmented frames; and FIG. 3B depicts an embodiment of a flowchart reception of fragmented frames;

FIGS. 4A-B depict embodiments of flowcharts to generate, transmit, receive, decode, and interpret communications with an acknowledgment procedure for fragmented frames as illustrated in FIGS. 1-2.

DETAILED DESCRIPTION OF EMBODIMENTS

Figure 1:
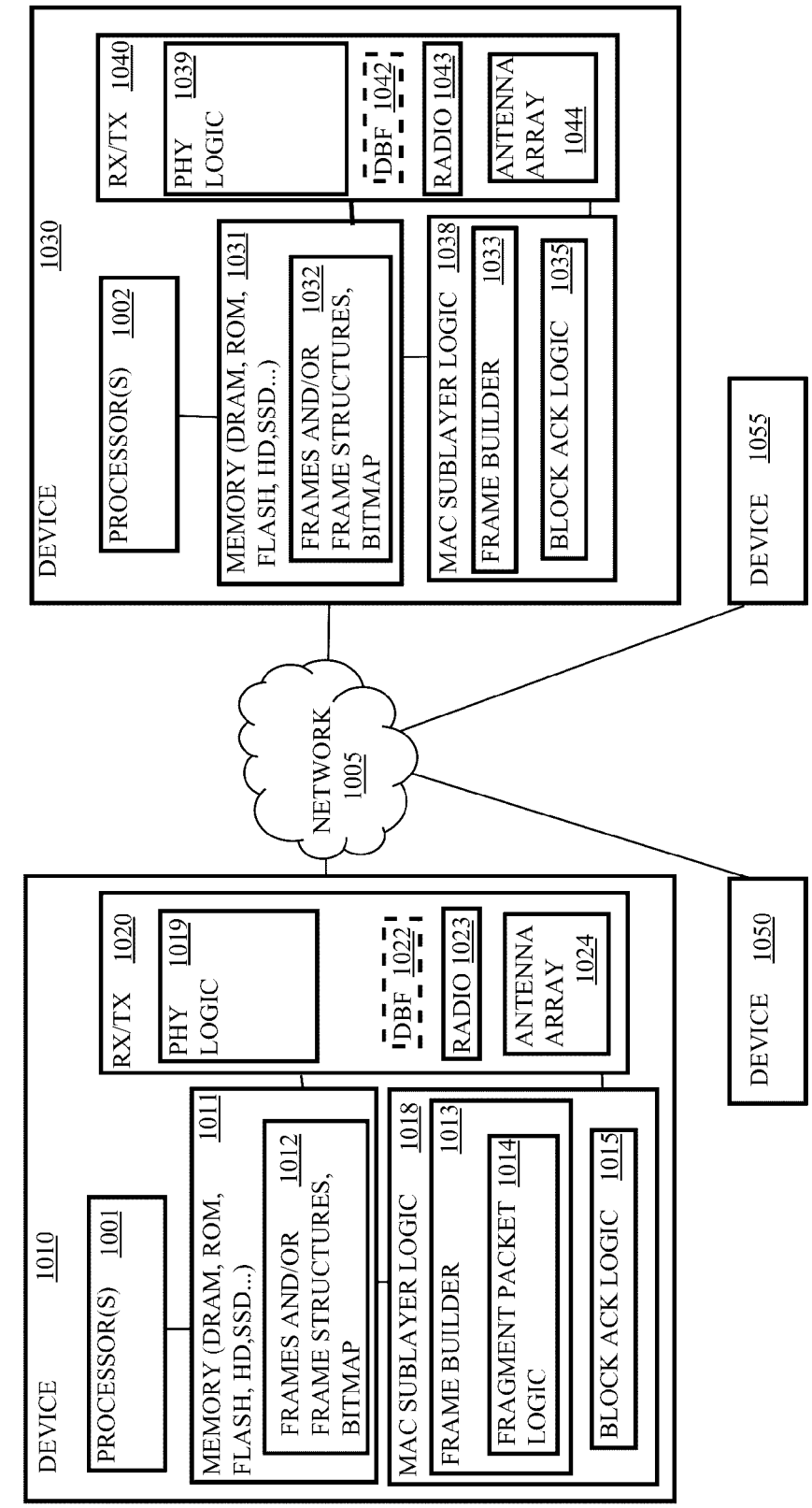
FIG. 1 depicts an embodiment of a wireless network comprising a plurality of communications devices, including multiple fixed or mobile communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives as defined by the appended claims. The detailed descriptions below are designed to make such embodiments understandable and obvious to a person having ordinary skill in the art.

The Institute of Electrical and Electronic Engineers (IEEE) 802.11 systems typically use a media access control (MAC) frame format to convey control information and data. Some of these systems implement a frame format with a MAC header that may introduce significant overhead, particularly for a shorter payload, or MAC protocol data unit (MPDU). For example, IEEE 802.11ah systems may support 1 MHz channel bandwidth and the lowest supported physical layer (PHY) data rate may be 150 kilobits per second (Kbps). Such IEEE 802.11ah systems may offer a much longer transmission range but, at the same time, increase durations of packet transmissions. For a 1500 Byte packet, for instance, the transmission duration may be about 80 milliseconds (ms), which is too long for one packet to occupy the communication medium. Therefore, for such a big packet, an IEEE 802.11ah station may fragment the packet and send the packet in multiple packets with fragmented frames.

In the current baseline IEEE 802.11 systems, each fragment, or fragmented frames, is acknowledged in accordance with a normal acknowledgement (normal ACK) policy, which represents a significant overhead in the acknowledgement protocol. For example, if an embodiment fragments a packet into 16 fragments and implements a normal ACK, 16 ACK frames have to be added to the communication medium plus necessary Short Interframe Space (SIFS) times such as SIFS 1210 illustrated in the timing diagram 1200 in FIG. 1C. A Short Interframe Space (SIFS) is the small time interval between a data packet and its acknowledgment, which is a normal ACK 1205 in FIG. 1C. SIFS may have a fixed value per PHY and may be calculated to provide a transmitting station time to switch back to receive mode after transmitting the data packet so the transmitting station is capable of decoding the incoming packets.

For situations in which a receiving system is acknowledging receipt of multiple data packets such as multiple fragmented frames, many embodiments minimize communication overhead by transmitting a block acknowledgement (BlockACK) to acknowledge multiple frames in a single response. One type of BlockACK that also minimizes the size of the acknowledgment response is a null data packet (NDP) BlockACK. However, the limitations on size of the NDP BlockACK, while reducing overhead, also places limitations on the number of fragmented frames that can be acknowledged in a single NDP BlockACK. In IEEE 802.11ah systems, for a 1 MHz bandwidth PHY protocol data unit (PPDU), according to one embodiment, only eight fragmented frames can be acknowledged by a NDP BlockACK frame due to the limitation of the Bitmap size in the NDP BlockACK. Since fragmentation can have up to 16 fragments of a frame in some IEEE 802.11ah systems, the NDP BlockACK can only acknowledge 8 fragments and, from the 9th fragment on, the receiving station may use the immediate ACK. The immediate ACK, or normal ACK, is an acknowledgement policy in which the receiving station responds to each data packet a SIFS after receipt of the data packet. This is shown with the NDP BlockACK 1305 and the normal ACK 1310 in the timing diagram 1300 in FIG. 1D.

The first bit of the NDP BlockACK frame indicates the first fragmented frame (i.e. D#0). Note that D#x (x being 0 through 15) in FIGS. 1C, 1D, and 1E denote the fragment index, or fragment number, of the fragmented frame being transmitted in a data packet and note that the time lines in these figures start with D#0 and end after the ACK transmission denoted by the "A" or the NDP BlockACK denoted by the "BA", which are a SIFS after D#15. Also note that the frames shown above the time line represent transmission by a transmitting station to a receiving station and the frames illustrated below the time line are frames transmitted by a receiving station to the transmitting station.

Many embodiments provide an efficient acknowledgement procedure to acknowledge fragmented frames. Embodiments may comprise logic such as hardware and/or code to use an NDP BlockACK frame for the fragments with a fragment index greater than X fragments so that L NDP BlockACK frames can acknowledge up to L times X (L*X) fragmented frames, wherein X is the limitation on the number of frames that can be acknowledged by a single NDP BlockACK. For example, for IEEE 802.11ah systems, two NDP BlockACKs that are capable of acknowledging up to 8 data fragments each may be capable of acknowledging up to 16 data fragments. As compared to FIG. 1C, embodiments may perform the same communication with 14 less ACKs and, as compared to FIG. 1D, embodiments may perform the same communication with seven less ACKs.

While several embodiments may refer to IEEE 802.11ah systems as illustrations, embodiments are not limited to IEEE 802.11ah systems. Embodiments are generally applicable to all IEEE 802 systems and all wireless communication technologies that implement acknowledgement policies such as the BlockACK policy.

Many embodiments may include a Fragment Number subfield in the Sequence Control field of each fragmented data frame. In some embodiments, the transmitting stations (STAs) may perform actions such as fragmenting a frame into N fragments (fragment indices=0 . . . N−1) and setting the first Fragment index to 0. In many embodiments, the fragment index of each fragment is a unique identifier for the fragment amongst the other fragments so that the transmitting station and the receiving station can identify the fragments by their indices. In many embodiments, the transmitting STAs may determine whether to send a BlockACK or an implicit BlockACK based upon a function and the fragment index. The BlockACK may inform the receiving station to not transmit a BlockACK in response to this data packet but to wait to send the NDP BlockACK.

In several embodiments, the function may be: If the current fragment number plus one mod X is not equal to zero and if this fragment is not the last fragment to be transmitted in a data packet, then transmit a fragmented frame with the ACK Policy=BlockACK, telling the receiving STA not to respond to this frame but respond to after the frame that has received the ACK Policy=Implicit BlockACK Request. In such embodiments, the transmitting station may then increase the fragment index by 1 and repeat for this process for the next fragment. Note that X equals 8 in the IEEE 802.11ah example above.

Note also that "A mod X" is an abbreviation of A modulo X, which is a mathematical function. A mod X is the remainder of the Euclidean division of A by X. For example, the expression "5 mod 2" would evaluate to 1 because 5 divided by 2 leaves a quotient of 2 and a remainder of 1, while "9 mod 3" would evaluate to 0 because the division of 9 by 3 has a quotient of 3 and leaves a remainder of 0.

On the other hand, if the current fragment number plus one mod X is equal to zero or if the current fragment is the last fragment to be transmitted in a data packet, many embodiments may then transmit a fragmented frame with the ACK Policy=Implicit BlockACK to instruct the receiving STA to respond with an NDP BlockACK. In many embodiments, the transmitting STA may then wait for an NDP BlockACK from the receiving STA.

In several embodiments, the transmitting station may receive an NDP BlockACK and may determine the bits of the Bitmap field of the NDP BlockACK frame to determine an acknowledgement status of each of the fragmented frames transmitted to the receiving station. In some embodiments, the transmitting station may determine the fragment index associated with the first bit in the bitmap of the NDP BlockACK as:

Fragment Number=floor(fragment number last transmitted/$X$)*$X$

Where floor(b) rounds the value b to the nearest integer less than or equal to b and X is the number of bits in the bitmap field of the BlockACK.

To illustrate, if the fragment number last transmitted=15 and X=8:

Fragment Number=floor(15/8)*8=1*8=8

Thus, the first bit in the bitmap is associated with the fragment index 8 in this example.

In some situations, the receiving station may not receive all of the fragments. In response, the transmitting station may receive an NDP BlockACK with a BlockACK bitmap that includes an indication that one or more of the fragments were not received. If such errors are indicated in the BlockACK bitmap, the station may, in some embodiments, retransmit only the undelivered fragmented frames. The ACK Policy may be set to BlockACK except the last undelivered fragmented frame, in which the ACK Policy is set to Implicit BlockACK Request to request an NDP BlockACK from the receiving station.

Also, in some embodiments, if an NDP BlockACK frame is not received before the ACK timeout period, the transmitting station may retransmit the last fragmented frame with the ACK Policy set to Implicit BlockACK Request.

On the other hand, if there are no errors indicated in the BlockACK bitmap, and if there are more than X, e.g., 8, fragmented frames to transmit, the transmitting station may increase the fragment number to X, e.g., 8, and may start to transmit remaining fragmented frames in the same manner as described above.

In many embodiments, the receiving station may perform actions such as initializing the BlockACK bitmap to all zeros. If the fragment number of the received frame is Z, then the receiving station may set the, e.g., ((Z mod N) plus 1)-th bit of the BlockACK bitmap to 1 to indicate successful reception of the frame. For instance, if the maximum supported fragment numbers in a BlockACK bitmap is 8 and the fragment number is 13 then the fragment corresponds to the ((13 mod 8) plus 1)-th bit or the 6th bit. If the bits are numbered 0 through N than the bit number would be (Z mod N) or 13 mod 8, which is bit number 5.

Furthermore, if the ACK Policy of the received fragmented frame is an Implicit BlockACK Request, then the receiving STA may transmit an NDP BlockACK frame with the BlockACK Bitmap a SIFS after the reception of the frame. And if the ACK Policy of the received frame is BlockACK, then, the receiving STA may take no action except for recording the state of the frame reception.

Some embodiments implement a one Megahertz (MHz) channel bandwidth for Institute of Electrical and Electronic Engineers (IEEE) 802.11ah systems. The lowest data rate in such embodiments may be approximately 6.5 Megabits per second (Mbps) divided by 20=325 Kilobits per second (Kbps). If two times repetition coding is used, the lowest data rate drops to 162.5 Kbps. Many embodiments may enable small battery-powered wireless devices (e.g., sensors) to use Wi-Fi to connect to the, e.g., Internet with very low power consumption.

Various embodiments may be designed to address different technical problems associated with system overhead associated with acknowledging fragmented frames. For instance, some embodiments may be designed to address one or more technical problems such as determining an ACK procedure to handle usage of more than one set of fragments with more than one NDP BlockACKs, determining that fragment numbers at which to transmit an implicit ACK, handling a response indicating undelivered fragmented frames, and determining a bit number in a bitmap of an NDP BlockACK that corresponds to a fragmented frame.

Different technical problems such as those discussed above may be addressed by one or more different embodiments. For instance, some embodiments that address system overhead associated with acknowledging fragmented frames may do so by one or more different technical means such as determining protocols to handle more fragments of a frame than the maximum that can be included in a bitmap of an NDP BlockACK, determining a fragment number to associate with a an implicit ACK policy, determining a bit number in a bitmap associated with fragment numbers that are greater than the maximum that can be included in a bitmap of an NDP BlockACK, determining error handling protocols, and the like.

Some embodiments may take advantage of Wireless Fidelity (Wi-Fi) network ubiquity, enabling new applications that often require very low power consumption, among other unique characteristics. Wi-Fi generally refers to devices that implement the IEEE 802.11-2012, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/get-ieee802/download/802.11-2012.pdf) and other related wireless standards.

Several embodiments comprise access points (APs) for and/or client devices of APs or stations (STAs) such as routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

This disclosure is not limited to WLAN related standards, but may also apply to wireless wide area networks (WWANs) and 3G or 4G wireless standards (including progenies and variants) related to wireless devices, user equipment or network equipment included in WWANs. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The examples are not limited in this context.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point. The communications device 1030 may comprise a low power communications device such as a sensor, a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a sensor such as the communications device 1030 and the communications device 1030 may be integrated with or coupled to a water meter usage meter.

The communications device 1030 may gather data over a period of time and then wake to transmit the data to the communications device 1010. In some embodiments, the communications device 1030 may wake during a window in which the communications device 1030 contends or competes for access. In further embodiments, the communications device 1030 may wake during a restricted access window assigned to the communications device 1030 for communication with the communications device 1010.

The communications device 1030 may have such a large payload of data to transmit to the communications device 1010. The medium access control (MAC) sublayer logic 1038 of the communications device 1030 may determine to fragment the data frame into 18 fragments and may assign the fragments indices 0 through 17.

In many embodiments, fragmenting the data frame into 18 fragments may involve generating 18 MAC data frames to transmit to the communications device 1010. In several embodiments, each of the 18 MAC data frames may include a fragment number field that includes a value indicative of the fragment index of the fragment being transmitted within the data frame. Furthermore, many embodiments include an indication of an acknowledgement (ACK) policy. For instance, several embodiments include an ACK policy field and include a value in the field that requests a particular ACK policy. In some embodiments, the ACK policy field may include two bits so that at least four different ACK policies can be requested of the communications device 1010 such as a normal ACK or implicit ACK bit sequence 00, a No ACK bit sequence of 10, a No explicit ACK or power save multi-poll (PSMP) ACK bit sequence 01, and a block ACK with bit sequence 11.

The MAC sublayer logic 1038 may select the ACK policy based upon an efficient ACK procedure for transmitting large numbers of data packets with fragments of a data frame. In particular, the MAC sublayer logic 1038 may determine that the maximum number of fragments that can be acknowledged by the communications device 1010 in a null data packet (NDP) BlockACK is 8 because the bitmap in the NDP BlockACK can only facilitate acknowledgements for 8 fragments.

In some embodiments, the MAC sublayer logic 1038 may determine that the number of fragments exceeds, e.g., 8 fragments and, as a result choose this efficient ACK procedure. In other embodiments, the efficient ACK procedure may be default or standard.

In accordance with the efficient ACK procedure, the MAC sublayer logic 1038 may set the ACK policy to request a BlockACK for the first seven of the data packets in a set of eight data packets, informing the communications device 1010 to wait until the communications device 1010 receives a data packet with a request for an implicit BlockACK before transmitting an NDP BlockACK to confirm delivery of fragments or undelivered fragments in the data packets. In many embodiments, the last data packet in the set, e.g., the eighth data packet in this embodiment, may include an implicit BlockACK to inform the communications device 1010 to transmit an NDP BlockACK.

After or during the fragmentation of the data frame into 18 segments, the physical layer (PHY) logic 1039 may generate PHY frames or packets by at least prepending a preamble to the data frames. In several embodiments, PHY logic 1039 may then transmit the data packets to the communications device 1010.

As the communications device 1010 receives the transmissions of the data packets from the communications device 1030, the MAC sublayer logic 1018 of the communications device 1010 may decode, parse, and interpret the data packets to identify the ACK policy request for BlockACK in the first seven data packets, the fragment index value from a fragment number field, and the fragment. As the MAC sublayer logic 1018 determines the fragment index of the fragment received, the MAC sublayer logic 1018 may set a bit corresponding to the fragment index in a sequence of bits to a logical one. In some embodiments, the sequence of bits may be in memory and, in some embodiments, the sequence of bits may be a bitmap for the next NDP BlockACK to transmit to the communications device 1030 to acknowledge delivery or non-delivery of each of the fragments.

Upon receipt of the eighth data packet, the MAC sublayer logic 1018 may detect the implicit BlockACK request in the data packet and, after a short interframe space (SIFS), for example, the MAC sublayer logic 1018 may transmit the NDP BlockACK with the bitmap that includes the sequence of bits. Thereafter, if the bitmap in the NDP BlockACK indicates that one or more of the fragments is undelivered, the communications device 1030 may receive and interpret the bitmap to determine which fragments were not delivered and then retransmit those fragments in data packets.

Once the communications device 1030 retransmits any undelivered fragments, the communications device 1030 may begin to transmit the next set of 8 fragments, such as fragment indices 8 through 15, including BlockACK requests with fragment indices 8 through 14 and including an implicit BlockACK request with fragment index 15.

The communications device 1010 may receive the fragments and respond to the implicit BlockACK request with an NDP BlockACK that includes a bitmap with a sequence of bits representing acknowledgements of delivery or the failure to receive the fragments identified by fragment indices 8 through 15. If any of the bits in the bitmap are logical zeros in the present embodiment, these bits represent undelivered fragments. For instance, the fragment index, sometimes referred to as the fragment number, may equal A. If the bit numbers are 0 through 7 in the bitmap, the bit number in the 8-bit bitmap is A mod 8. If A=13 indicating fragment index 13, the bit number to set is 13 mod 8, which is bit number 5. Other embodiments may determine the offset in the bitmap. For instance, the offset may be A+1 mod 8, or 14 mod 8, which equals 6. So the 6th bit represents fragment index 13 in the bit sequence of the bitmap.

If any errors are indicated in the bitmap, the communications device 1030 may retransmit those fragments and, in some embodiments, wait for acknowledgement of the retransmitted fragments before continuing with the transmission of the next set of fragments.

In the present embodiment, the communications device 1030 may two more 18 fragments to transmit so the MAC sublayer logic 1030 may generate a set of two data packets with fragment indices 16 and 17 to transmit the fragments to the communications device 1010. The first data packet may include a BlockACK request similar to the previous two sets. The second data packet, being the last packet with the last fragment to transmit in the set of packets, may include a request for the implicit BlockACK.

The communications device 1010 may respond to the set of data packets in the same way but only use the first two bits in the bitmap of the NDP BlockACK to identify delivered or undelivered fragments. And the communications device 1030 may retransmit fragments if necessary.

Figure 1A:
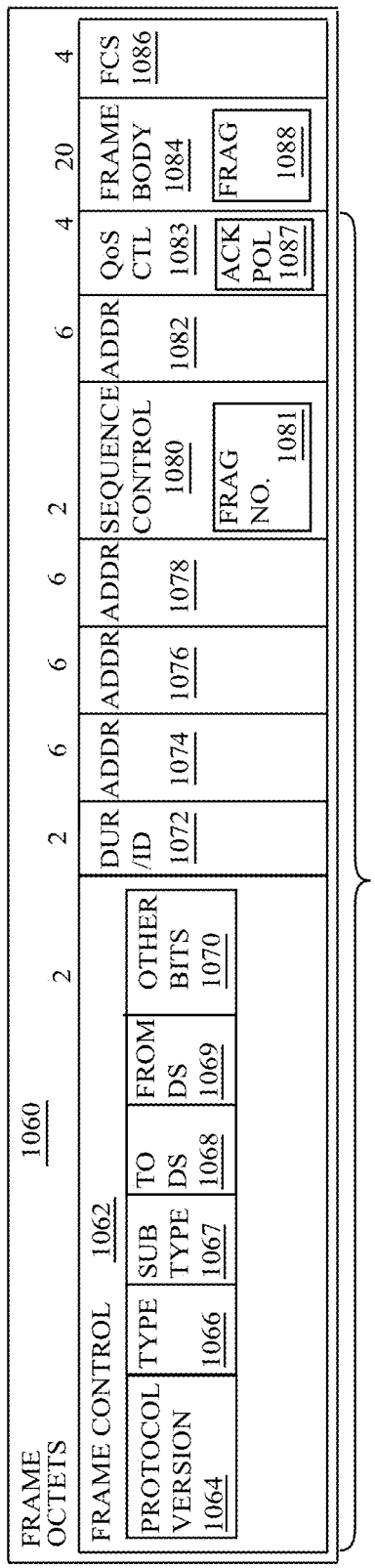
FIG. 1A depicts an embodiment of a data frame with a sequence control field and a fragment number subfield.

FIG. 1A illustrates an embodiment of a data frame 1060 with a sequence control field 1080 having a fragment number 1081 subfield. FIG. 1A illustrates an embodiment of a frame 1060. In other embodiments, the frame 1060 may have more or less fields, different fields, and/or fields with different field lengths. In the embodiment illustrated in FIG. 1A, the frame 1060 comprises a MAC header 1061 followed by a frame body field 1084 and a frame check sequence (FCS) field 1086. The frame body field 1084 may comprise one or more frames also referred to as MAC sublayer Service Data Units (MSDUs). The frame body 1084 may be a variable number of octets such as zero to 2312 octets and may include data elements such as one or more fragments as well as control elements, parameters, and capabilities. The FCS field 1086 may be four octets and may include extra checksum characters added to the frame 1060 for error detection and correction such as a cyclic redundancy check value.

The MAC header 1061 may comprise the frame control field 1062, a duration/identifier (DUR/ID) field 1066, an address (ADDR) field 1074, an ADDR field 1076, an ADDR field 1078, a Sequence Control (SEQ CTL) field 1080, an ADDR field 1082, and a quality of service control (QoS CTL) field 1083. The frame control field 1062 may be two octets and may identify the type and subtype of the frame such as a data type and data subtype. One or more of the fields ADDR 1076, ADDR 1078, Sequence Control 1080, ADDR 1082, QoS control 1083, and frame body 1084 may only be present in certain frame types and subtypes of the frames.

The frame control field 1062 may comprise a protocol version field 1064, a type field 1066, a subtype field 1067, a TO DS field 1068, a FROM DS field 1069, and other frame control bits 1070. The protocol version field 1064 may be two bits in length (B0-B1). The value of the protocol version field 1064 may represent the revision of the corresponding standard that the frame represents. The type field 1066 may be two bits in length (B2-B3) and may identify the type of frame 1060 as, e.g., a management frame, a data frame, or a control frame. The subtype field 1067 may be four bits in length (B4-B7) and may identify the subtype of the frame 1060 as, e.g., a particular type of management frame, data frame, or control frame.

The TO DS field 1068 and the FROM DS field 1069 may be one bit in length each (B8-B9) and may identify information about the origin and/or destination of the frame. For instance, in some embodiments, if the value in the TO DS field 1068 is a logical zero and the value in the FROM DS field 1069 is a logical zero, the transmission may comprise a data frame transmitted direct from one STA to another STA within the same IBSS, a data frame transmitted direct from one non-AP STA to another non-AP STA within the same BSS, or a management or control frame.

In the present embodiment, the Sequence Control field 1080 may comprise one or more bits in a Fragment Number field 1081 to identify the fragment index value for a fragment 1088 included the Frame Body field 1084. And the QoS CTL field 1083 may comprise an ACK policy field 1087 to indicate an ACK policy request such as a request for a normal ACK, a BlockACK, or an implicit BlockACK.

Figure 1B:
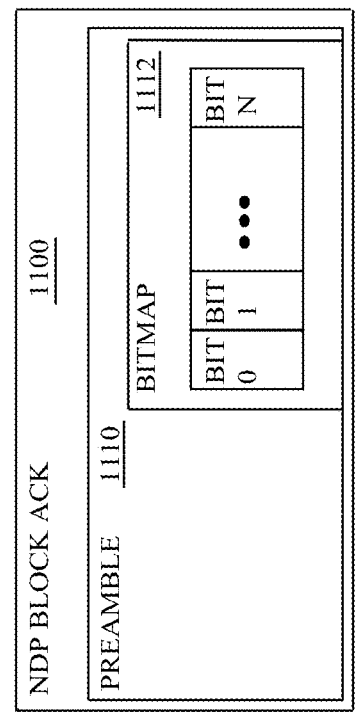
FIG. 1B depicts an embodiment of an null data packet (NDP) block acknowledgement (BlockACK) with a Bitmap.
Figure 1C:
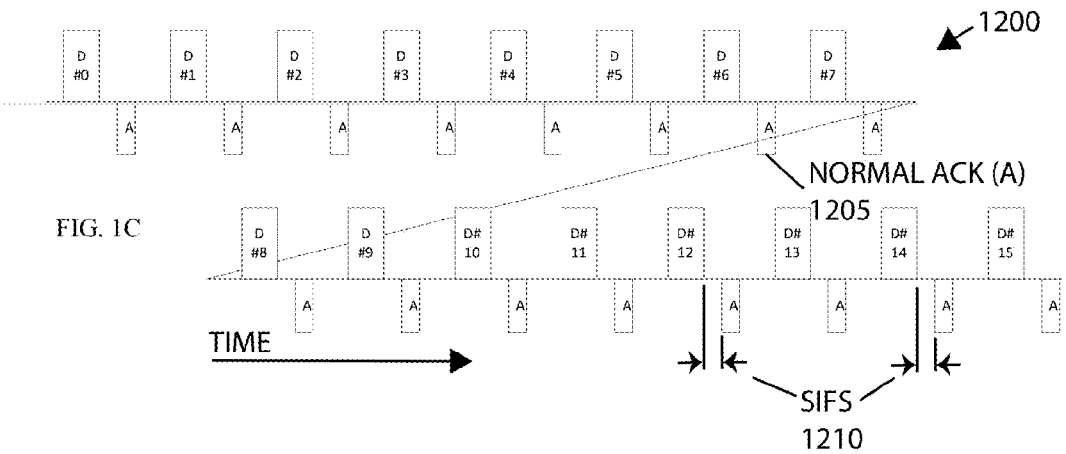
FIG. 1C depicts an embodiment of a transmission of a large frame that is fragmented into 16 packets with no block acknowledgments.
Figure 1D:
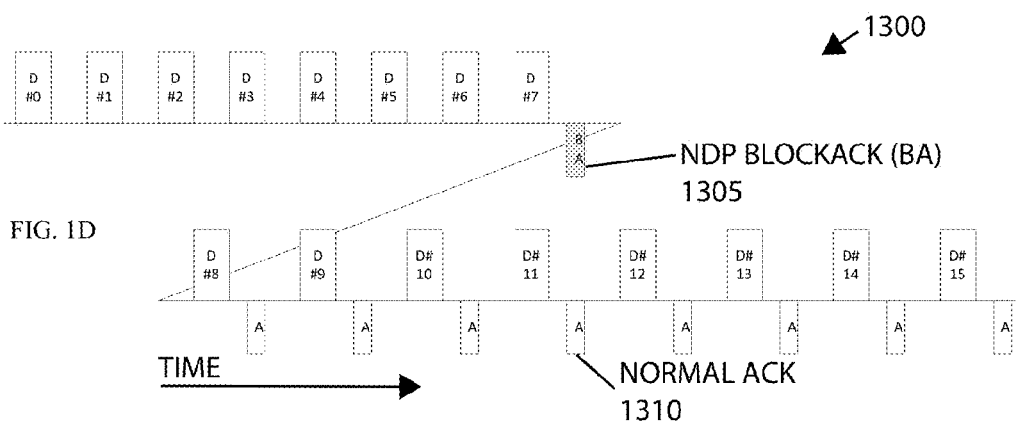
FIG. 1D depicts another embodiment of a transmission of a large frame that is fragmented into 16 packets with one block acknowledgment.

FIG. 1B illustrates an embodiment of a null data packet, or no data packet, (NDP) block acknowledgement (BlockACK) frame 1100. The NDP BlockACK 1100 may take different forms depending upon the communication protocols being implemented. For instance, in some embodiments, the NDP BlockACK 1100 may comprise a MAC frame and, in other embodiments, the NDP BlockACK 1100 may not comprise a MAC frame. In the present embodiment, the NDP BlockACK 1100 comprises a PHY frame that MAC sublayer logic may instruct the PHY to transmit. The NDP BlockACK 1100 may comprise a preamble 1110 that may comprise training fields such as short training fields and long training fields. The preamble 1110 may also comprise a bitmap 1112 to include a sequence of bits, Bit 0 through Bit N) that indicates whether or not a fragment of a fragmented frame has been delivered. In some embodiments, the bitmap 1112 may be part of the signal field of the preamble.

Figure 1E:
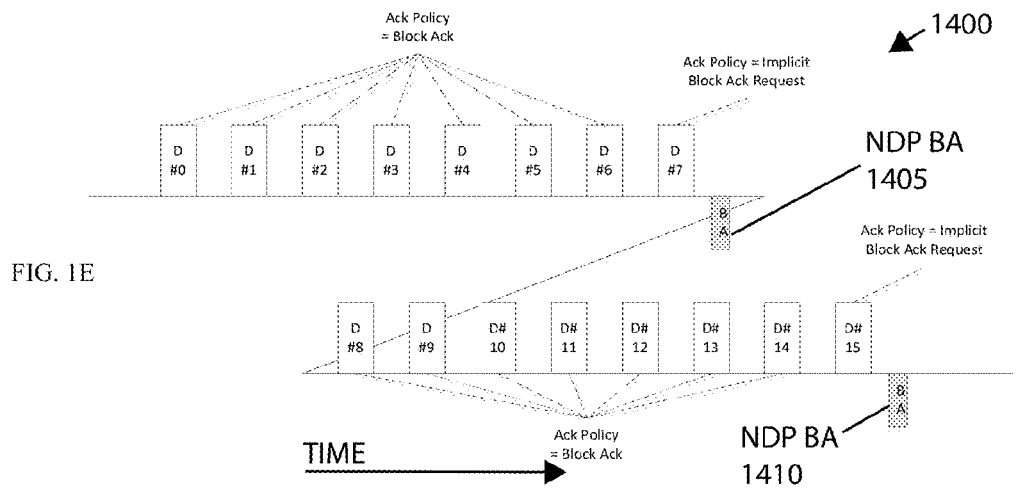
FIG. 1E depicts another embodiment of a transmission of a large frame that is fragmented into 16 packets with two block acknowledgments.

FIG. 1E depicts an embodiment of a timing diagram 1400 for an acknowledgement procedure for 16 fragments (D#0 through D#15) of a fragmented frame. In this embodiment, the 16 fragments are acknowledged with two NDP BlockACK frames 1405 and 1410, reducing the overhead of the protocol compared to FIGS. 1C and 1D. Note that fragments D#0 through D#6 and D#8 through D#14 are transmitted with ACK policy requests for a BlockACK and the last data packets in the set including fragment D#7 and fragment D#15 are transmitted with an ACK policy requests for an implicit BlockACK. Some of these embodiments may enable small battery powered wireless devices (e.g. sensors) to use Wi-Fi (802.11) to connect to the Internet with very low power consumption. Note, however, that embodiments described herein are not limited to a single standard or protocol. These embodiments can be applied to any wireless communications standards or protocols that use ACK policies such as BlockACK and implicit BlockACK as well as an ACK that has a limited amount of data capacity for acknowledging receipt of fragments, regardless of the nomenclature.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise processor(s) 1001 and 1002, memory 1011 and 1031, and MAC sublayer logic 1018 and 1038, respectively. The processor(s) 1001 and 1002 may comprise one or more data processing devices such as microprocessors, microcontrollers, state machines, and the like. The memory 1011 and 1031 may comprise a storage medium such as Dynamic Random Access Memory (DRAM), read only memory (ROM), buffers, registers, cache, flash memory, hard disk drives, solid-state drives, or the like. The memory 1011 and 1031 may store the frames and/or the frame structures such as standard frame structures identified in IEEE 802.11 and may include memory for use in storing sequences of bits for a bitmap. Note also that memory 1011 and 1031 may reside in a system or in proximity to or in the MAC sublayer logic 1018 and 1038 or the transceivers (RX/TX) 1020 and 1040.

Referring again to FIG. 1, the MAC sublayer logic 1018, 1038 may comprise logic to implement functionality of the MAC sublayer of the data link layer of the communications device 1010, 1030. The MAC sublayer logic 1018, 1038 may generate the frames such as management frames, data frames, and control frames, and may communicate with the PHY logic 1019, 1039 to transmit the frames. The PHY logic 1019, 1039 may generate physical layer protocol data units (PPDUs) based upon the frames. More specifically, the frame builders 1013 and 1033 may generate the frames and data unit builders of the PHY logic 1019, 1039 may prepend the frames with preambles to generate PPDUs for transmission via a physical layer device such as the transceivers (RX/TX) 1020 and 1040.

The communications devices 1010, 1030, 1050, and 1055 may each comprise a transceiver such as transceivers 1020 and 1040. Each transceiver 1020, 1040 comprises a radio 1023, 1043 comprising an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling Data tones are used to transfer information between the transmitter and receiver via one of the channels. Pilot tones are used to maintain the channels, and may provide information about time/frequency and channel tracking. Guard interval may be inserted between symbols such as the short training field (STF) and long training field (LTF) symbols during transmission to avoid inter-symbol interference (ISI), which might result from multi-path distortion. Guard tones help the signal conform to a spectral mask. The nulling of the direct component (DC) may be used to simplify direct conversion receiver designs.

In some embodiments, the communications device 1010 optionally comprises a Digital Beam Former (DBF) 1022, as indicated by the dashed lines. The DBF 1022 provides spatial filtering and is a signal processing technique used with antenna array 1024 for directional signal transmission or reception. This is achieved by combining elements in a phased antenna array 1024 in such a way that signals at particular angles experience constructive interference while others experience destructive interference. Beamforming can be used at both the transmitting and receiving ends in order to achieve spatial selectivity. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042.

Figure 2:
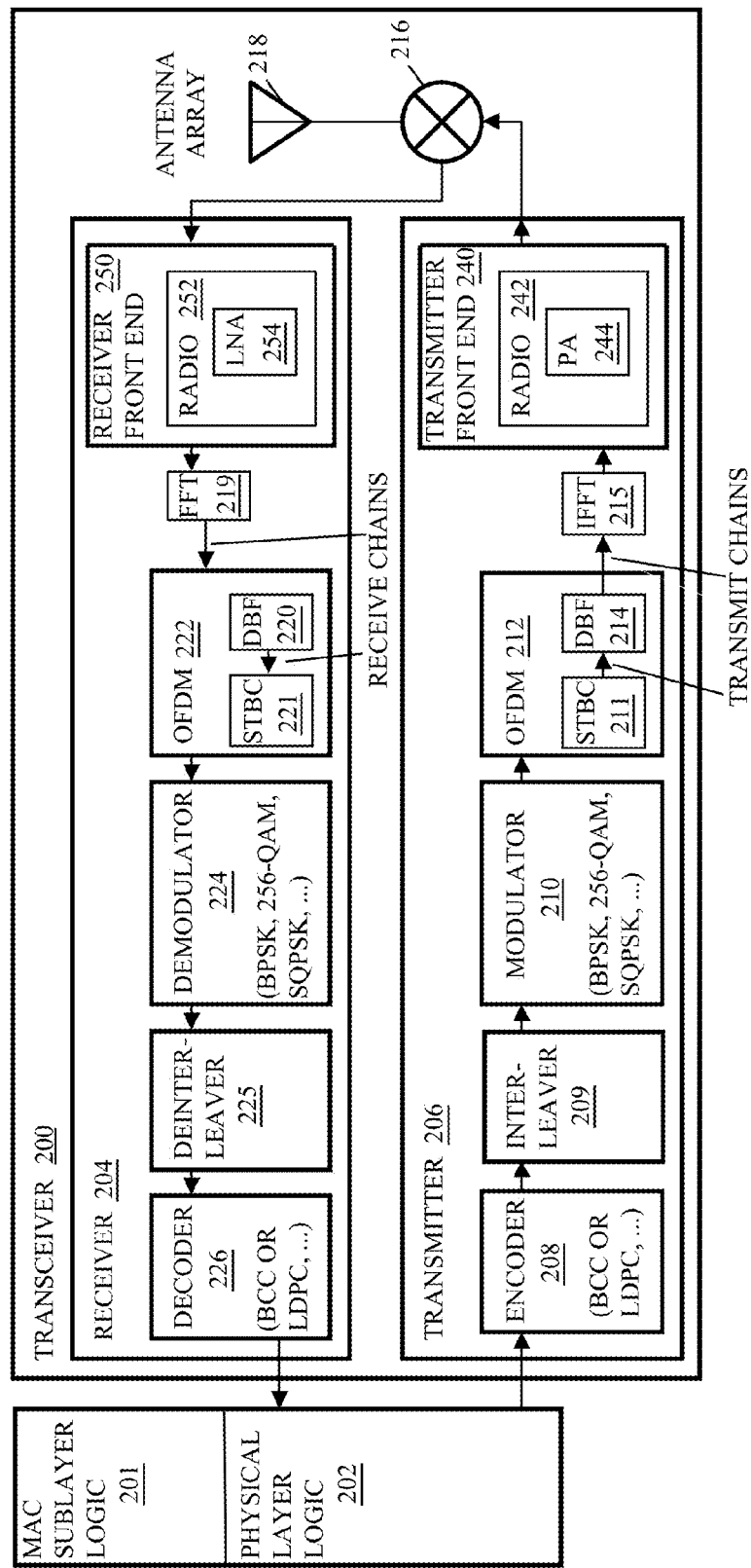
FIG. 2 depicts an embodiment of an apparatus with an acknowledgment procedure for fragmented frames.

FIG. 2 depicts an embodiment of an apparatus to generate, transmit, receive, and interpret or decode frames including fragmented frames. The apparatus comprises a transceiver 200 coupled with Medium Access Control (MAC) sublayer logic 201 and a physical layer (PHY) logic 202. The MAC sublayer logic 201 may determine a frame and the physical layer (PHY) logic 202 may determine the PPDU by prepending the frame or multiple frames, also called MAC protocol data units (MPDUs), with a preamble to transmit via transceiver 200. For example, a frame builder may generate multiple frames including management type frames, data type frames, or control type frames. A control frame may include a Ready-To-Send or Clear-To-Send frame. A management frame may comprise a Beacon, Probe Request/Response, Association Request/Response, and Reassociation Request/Response frame type. And the data type frame is designed to transmit data.

In many embodiments, the MAC sublayer logic 201 may comprise the frame builder to generate frames (MPDUs). For example, a frame builder may generate multiple frames that are fragments of a large frame. Each frame of the multiple frames may include a type field that specifies the type of the frame as a data frame. Each frame of the multiple frames may also include an ACK policy field to indicate the ACK policy associated with the frame such as, e.g., a normal ACK, an implicit BlockACK, or a BlockACK. And each frame of the multiple frames may include a fragment number field to indicate a fragment index for a fragment that is included in the frame body.

The PHY logic 202 may comprise a data unit builder. The data unit builder may determine a preamble and may prepend the MPDU with the preamble to generate a PPDU. In many embodiments, the data unit builder may create the preamble based upon communications parameters chosen through interaction with a destination communications device.

The transceiver 200 comprises a receiver 204 and a transmitter 206. The transmitter 206 may comprise one or more of an encoder 208, an interleaver 209, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The interleaver 209 may receive data from encoder 208 and may interleave the data to prevent long sequences of adjacent noisy bits from entering a BCC decoder of a receiver. The modulator 210 may receive data from interleaver 209, if the interleaver is implemented, and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid.

The output of modulator 209 is fed to an orthogonal frequency division multiplexing (OFDM) module 212. The OFDM module 212 may comprise a space-time block coding (STBC) module 211, a digital beamforming (DBF) module 214, and an inverse, fast Fourier transform (IFFT) module 215. The STBC module 211 may receive constellation points from the modulator 209 corresponding to one or more spatial streams and may spread the spatial streams to a greater number of space-time streams (also generally referred to as data streams). Further embodiments may omit the STBC.

The OFDM module 212 impresses or maps the modulated data formed as OFDM symbols onto a plurality of orthogonal subcarriers so the OFDM symbols are encoded with the subcarriers or tones. In some embodiments, the OFDM symbols are fed to the Digital Beam Forming (DBF) module 214. Generally, digital beam forming uses digital signal processing algorithms that operate on the signals received by, and transmitted from, an array of antenna elements.

The Inverse Fast Fourier Transform (IFFT) module 215 may perform an inverse discrete Fourier transform (IDFT) on the OFDM symbols. The output of the IFFT module 215 may enter the guard interval (GI) module. The GI module may insert guard intervals by prepending to the symbol a circular extension of itself. In some embodiments, the GI module may also comprise windowing to optionally smooth the edges of each symbol to increase spectral decay.

The output of the GI module may enter the transmitter front end 240. The transmitter front end 240 may comprise a radio 242 with a power amplifier (PA) 244 to amplify the signal and prepare the signal for transmission via the antenna array 218.

In one embodiment, the radio 242, 252 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio 242, 252 may include, for example, a receiver, a transmitter and/or a frequency synthesizer. The radio 242, 252 may include, for instance, bias controls, and a crystal oscillator, and may couple with one or more antennas 218. In another embodiment, the radio 242 may use external voltage-controlled oscillators (VCOs), surface acoustic wave filters, intermediate frequency (IF) filters and/or RF filters, as desired. Due to the variety of potential RF interface designs an expansive description thereof is omitted.

The signal may be up-converted to a higher carrying frequency or may be performed integrally with up-conversion. Shifting the signal to a much higher frequency before transmission enables use of an antenna array of practical dimensions. That is, the higher the transmission frequency, the smaller the antenna can be. Thus, an up-converter multiplies the modulated waveform by a sinusoid to obtain a signal with a carrier frequency that is the sum of the central frequency of the waveform and the frequency of the sinusoid.

The transceiver 200 may also comprise duplexers 216 connected to antenna array 218. Thus, in this embodiment, a single antenna array is used for both transmission and reception. When transmitting, the signal passes through duplexers 216 and drives the antenna with the up-converted information-bearing signal. During transmission, the duplexers 216 prevent the signals to be transmitted from entering receiver 204. When receiving, information bearing signals received by the antenna array pass through duplexers 216 to deliver the signal from the antenna array to receiver 204. The duplexers 216 then prevent the received signals from entering transmitter 206. Thus, duplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal. In other embodiments, the transceiver 200 may comprise one or more antennas rather than antenna arrays and, in several embodiments, the receiver 204 and the transmitter 206 may comprise their own antennas or antenna arrays.

The transceiver 200 may comprise a receiver 204 for receiving, demodulating, and decoding information bearing communication signals. The receiver 204 may comprise a receiver front-end to detect the signal, detect the start of the packet, remove the carrier frequency, and amplify the subcarriers via a radio 252 with a low noise amplifier (LNA) 254. The communication signals may comprise, e.g., 32 tones on a 1 MHz carrier frequency. The receiver 204 may comprise a fast Fourier transform (FFT) module 219. The FFT module 219 may transform the communication signals from the time domain to the frequency domain.

The receiver 204 may also comprise an OFDM module 222, a demodulator 224, a deinterleaver 225, and a decoder 226, and the equalizer 258 may output the weighted data signals for the OFDM packet to the OFDM module 222. The OFDM 222 extracts signal information as OFDM symbols from the plurality of subcarriers onto which information-bearing communication signals are modulated.

The OFDM module 222 may comprise a DBF module 220, and an STBC module 221. The received signals are fed from the equalizer to the DBF module 220. The DBF module 220 may comprise algorithms to process the received signals as a directional transmission directed toward to the receiver 204. And the STBC module 221 may transform the data streams from the space-time streams to spatial streams.

The demodulator 224 demodulates the spatial streams. Demodulation is the process of extracting data from the spatial streams to produce demodulated spatial streams. The method of demodulation depends on the method by which the information is modulated onto the received carrier signal and such information is included in the transmission vector (TXVECTOR) included in the communication signal. Thus, for example, if the modulation is BPSK, demodulation involves phase detection to convert phase information to a binary sequence. Demodulation provides to the deinterleaver 225 a sequence of bits of information.

The deinterleaver 225 may deinterleave the sequence of bits of information. For instance, the deinterleaver 225 may store the sequence of bits in columns in memory and remove or output the bits from the memory in rows to deinterleave the bits of information. The decoder 226 decodes the deinterleaved data from the demodulator 224 and transmits the decoded information, the MPDU, to the MAC sublayer logic 202.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing.

The MAC sublayer logic 201 may parse the MPDU based upon a format defined in the communications device for a frame to determine the particular type of frame by determining the type value and the subtype value. The MAC sublayer logic 201 may then parse and interpret the remainder of MPDU based upon the definition for the frame of the particular type and subtype indicated in the MAC header. For instance, if the frame is a data frame that includes a fragment with a fragment index and an ACK policy set to BlockACK, the MAC sublayer logic 201 may set a bit in a bitmap of an NDP BlockACK frame that corresponds to the fragment index to indicate that the fragment was successfully delivered to the MAC sublayer logic 201. In some embodiments, the MAC sublayer logic 201 may first reset all the values in the bitmap to logical zeros and change the values to logical ones for each of the successfully received fragments. Then, in response to a frame with an ACK policy set to BlockACK, the MAC layer sublayer logic may transmit the NDP BlockACK.

FIGS. 3A-B depict embodiments of flowcharts 300 and 350 for efficient ACK procedure for fragmented frames as discussed in conjunction with FIGS. 1-2. FIG. 3A illustrates an embodiment of a flowchart 300 to transmit fragmented frames. Fragmented frames are frames that include fragments of a larger frame and include a fragment index so that the receiving station (STA) may combine the fragments in the correct order to recreate the larger frame. The flowchart 300 begins with fragmenting the larger frame into N fragments, fragment indices 0 though N−1 (element 302). In many embodiments, the device may determine a number of fragments of a frame to generate to transmit the frame to a receiving station. In some embodiments, the number of fragments may be limited by a particular standard or protocol. In other embodiments, there may not be a limit on the number of fragments that may be generated other than the size of the frame that is being fragmented.

In many embodiments, if the current fragment number plus one modulo X is not equal to zero and if this fragment is not the last fragment to be transmitted in a data packet, then the transmitting station may transmit a fragmented frame with the ACK Policy set to BlockACK request (element 310) to instruct the receiving station not to respond to this frame but to respond after receiving a frame that has the ACK Policy is set to Implicit BlockACK Request. The transmitting station may then increase the fragment index by 1 and repeat for this process for the next fragment (element 315).

When the transmitting station reaches the last data packet in a set or the last packet to be transmitted, in many embodiments, the transmitting station may then transmit a fragmented frame with the ACK Policy set to Implicit BlockACK request to instruct the receiving station to respond with an NDP BlockACK (element 320). In many embodiments, the transmitting station may then wait for an NDP BlockACK from the receiving station. If an NDP BlockACK is not received before the expiration of a timeout period, in some embodiments, the transmitting station may retransmit the last data packet transmitted to request that the receiving station respond with the NDP BlockACK (element 322).

Upon receiving the NDP BlockACK (element 325), the transmitting station may determine whether bits in the bitmap of the NDP BlockACK indicate that any of the fragments were not delivered to the receiving station. The transmitting station may first determine the fragment number of the first bit of the bitmap of the received BlockACK based on the last transmitted fragment number (element 327). For instance, if the last fragment transmitted to the receiving station was fragment number 7 then fragment number of the first bit in the bitmap of the NDP BlockACK is floor(7/8)*8, which equals 0. On the other hand, if the fragment number of the fragment in the last data packet transmitted is 15 then the first bit in the bitmap is floor(15/8)*8, which equals 8.

Once the transmitting station determines the fragment number (or index) associated with the first bit in the bitmap, the transmitting station may identify the fragment number of each bit in the bitmap that is set to a logical zero to represent undelivered fragments. If the NDP BlockACK indicates that the receiving station did not receive one or more of the fragments, the transmitting station may retransmit the data packets with the undelivered fragments (element 330). Then, if there are more fragments to transmit, the transmitting station may set the fragment index to the next fragment in the sequence and repeat the process starting from element 310.

FIG. 3B illustrates an embodiment of a flowchart 350 to receive fragmented frames. The flowchart 350 begins with receiving a first set of fragments, or fragmented frames (element 355). In many embodiments, the first set of fragments may comprise a number of data packets with an ACK policy set to BlockACK followed by a last data packet in the set that sets the ACK policy to an implicit BlockACK. Some embodiments may use different terminology but the BlockACK request instructs that receiving station to wait until the last packet in a group of data packets is received before responding with an ACK.

Upon receipt of the first fragmented frame, in some embodiments, the receiving stations may initialize the BlockACK Bitmap to all logical zeros. The zeros may indicate that the fragment index corresponding to the logical zero has not been received. Thus, the receiving station can set the bits to a logical one as fragments are received and any bits that remain as a logical zero represent undelivered fragments. For instance, if the fragment number of the received frame is 9 and the number of bits in the bitmap is 8, then the receiving station may set the (9 mod 8) plus 1)-th bit in the BlockACK Bitmap to a logical 1 to indicate successful reception of the frame.

After receiving the last data packet in the set and setting the appropriate bit for the last data packet in the set, the receiving station may generate an NDP BlockACK with the bitmap, transmit the NDP BlockACK to the transmitting station and receive data packets with any undelivered fragments, if applicable (element 360). Thereafter, the receiving station may receive another set of fragments and repeat element 360 until receiving the last fragment (element 365).

FIGS. 4A-B depict embodiments of flowcharts 400 and 450 to transmit, receive, and interpret communications with a frame or a fragmented frame. Referring to FIG. 4A, the flowchart 400 may begin with receiving a fragmented frame from the MAC sublayer logic. The MAC sublayer logic of the communications device may generate the fragmented frame as a data frame to transmit to a receiving station and may pass the frame as an MAC protocol data unit (MPDU) to a PHY logic that transforms the fragmented frame into a packet that can be transmitted to the receiving station. The PHY logic may generate a preamble to prepend the PHY service data unit (PSDU) (the MPDU from the frame builder) to form a PHY protocol data unit (PPDU) for transmission (element 405). In some embodiments, more than one MPDU may be included in a PPDU.

The PPDU may then be transmitted to the physical layer device such as the transmitter 206 in FIG. 2 or the transceiver 1020, 1040 in FIG. 1 so the PPDU may be converted to a communication signal (element 410). The transmitter may then transmit the communication signal via the antenna (element 415).

Referring to FIG. 4B, the flowchart 450 begins with a receiving station such as the receiver 204 in FIG. 2 receiving a fragmented frame as a communication signal via one or more antenna(s) such as an antenna element of antenna array 218 (element 455). The receiver may convert the communication signal into an MPDU in accordance with the process described in the preamble (element 460). More specifically, the received signal is fed from the one or more antennas to a DBF such as the DBF 220. The DBF processes the received signal as a directional transmission directed toward to the receiver. The output of the DBF is fed to OFDM such as the OFDM 222. The OFDM extracts signal information from the plurality of subcarriers onto which information-bearing signals are modulated. Then, the demodulator such as the demodulator 224 demodulates the signal information via, e.g., BPSK, 16-QAM, 64-QAM, 256-QAM, QPSK, or SQPSK. And the decoder such as the decoder 226 decodes the signal information from the demodulator via, e.g., BCC or LDPC, to extract the MPDU (element 460) and transmits the MPDU to MAC sublayer logic such as MAC sublayer logic 202 (element 465).

The MAC sublayer logic may determine fragmented frame field values from the MPDU (element 470) such as the fragment number field value, the ACK policy field value, and the fragment from the frame body. For instance, the MAC sublayer logic may determine fragmented frame field values indicate that the fragment in the frame body is associated with fragment index 15 and the ACK policy is set to an implicit BlockACK. The MAC sublayer logic may determine that the MPDU comprises the 16th fragment of a fragmented frame and may set the 8th bit in a bit sequence of a bitmap to a logical one to indicate that the fragment was delivered. The MAC sublayer logic may then transmit the sequence in the bitmap of an NDP BlockACK to the transmitting station.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, an e-fuse, or the like may select still further features.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Further embodiments may include an apparatus to generate packets with an acknowledgement policy. The apparatus may comprise memory; and medium access control logic coupled with the memory to determine N fragments of a frame; to generate at least a first set and a second set of data packets, each of the data packets comprising one of the N fragments, wherein each set comprises up to X data packets, wherein X is a number of fragments that does not exceed a capacity of a bitmap in a Null Data Packet block acknowledgement to acknowledge delivery of fragments; to wait between transmission of the first set and transmission of the second set of data packets to receive acknowledgement of delivery of each of the fragments in the first set, wherein N is greater than X.

In some embodiments, the apparatus may further comprise a physical layer logic coupled with the medium access control logic to prepend each of the N fragments with a preamble for transmission and coupled with a radio to transmit the data packets. In some embodiments, the medium access control logic comprises logic to generate each of the data packets with a unique fragment index in a Fragment number subfield of a Sequence control field. In some embodiments, the medium access control logic comprises logic to generate the sets of data packets with a block acknowledgement policy request in all but a last data packet to transmit in each of the sets, the last data packet to transmit in each of the sets to comprise an implicit block acknowledgement policy request. In some embodiments, the medium access control logic comprises logic to retransmit undelivered fragments in response to receipt of a null data packet with an indication of the undelivered fragments.

Another embodiment comprises one or more tangible computer-readable non-transitory storage media comprising computer-executable instructions operable to, when executed by at least one computer processor, enable the at least one computer processor to implement a method comprising instructions to be executed by a processor-based device, wherein the instructions, when executed by the processor-based device, perform operations. The operations may comprise determining N fragments of a frame; generating at least a first set and a second set of data packets, each of the data packets comprising one of the N fragments, wherein each set comprises up to X data packets, wherein X is a number of fragments that does not exceed a capacity of a bitmap in a Null Data Packet block acknowledgement to acknowledge delivery of the number of fragments; and waiting between transmission of the first set and transmission of the second set of data packets to receive acknowledgement of delivery of each of the fragments in the first set, wherein N is greater than X.

In some embodiments, the operations further comprise generating the symbols comprises retransmitting undelivered fragments in response to receipt of a null data packet with an indication of the undelivered fragments. In some embodiments, generating at least a first set and a second set of data packets comprises generating each of the data packets with a unique fragment index in a Fragment number subfield of a Sequence control field. In some embodiments, generating at least a first set and a second set of data packets comprises generating each of the sets of data packets with a block acknowledgement policy request in all but a last data packet to transmit in each of the sets, the last data packet to transmit in each of the sets to comprise an implicit block acknowledgement policy request.

Another embodiment comprises a storage media to generate packets with an acknowledgement policy. The method may comprise determining N fragments of a frame; generating at least a first set and a second set of data packets, each of the data packets comprising one of the N fragments, wherein each set comprises up to X data packets, wherein X is a number of fragments that does not exceed a capacity of a bitmap in a Null Data Packet block acknowledgement to acknowledge delivery of the number of fragments; and waiting between transmission of the first set and transmission of the second set of data packets to receive acknowledgement of delivery of each of the fragments in the first set, wherein N is greater than X.

In some embodiments, the method may further comprise generating the symbols comprises retransmitting undelivered fragments in response to receipt of a null data packet with an indication of the undelivered fragments. In some embodiments, generating at least a first set and a second set of data packets comprises generating each of the data packets with a unique fragment index in a Fragment number subfield of a Sequence control field. In some embodiments, generating at least a first set and a second set of data packets comprises generating each of the sets of data packets with a block acknowledgement policy request in all but a last data packet to transmit in each of the sets, the last data packet to transmit in each of the sets to comprise an implicit block acknowledgement policy request.

Further embodiments may include a system to generate packets with an acknowledgement policy. The system may comprise a processor; a memory coupled with the processor; a medium access control logic coupled with the memory to determine N fragments of a frame; to generate at least a first set and a second set of data packets, each of the data packets comprising one of the N fragments, wherein each set comprises up to X data packets, where X is a number of fragments that does not exceed a capacity of a bitmap in a Null Data Packet block acknowledgement to acknowledge delivery of fragments; to wait between transmission of the first set and transmission of the second set of data packets to receive acknowledgement of delivery of each of the fragments in the first set, wherein N is greater than X; to wait between transmission of the sets of X data packets to receive acknowledgement of delivery of the number of fragments, wherein N is greater than X; one or more antennas; and a radio coupled with the one or more antennas to transmit the data packets.

In some embodiments, the medium access control logic comprises logic to generate each of the data packets with a unique fragment index in a Fragment number subfield of a Sequence control field. In some embodiments, the medium access control logic comprises logic to generate the sets of data packets with a block acknowledgement policy request in all but a last data packet to transmit in each of the sets, the last data packet to transmit in each of the sets to comprise an implicit block acknowledgement policy request. In some embodiments, the medium access control logic comprises logic to retransmit undelivered fragments in response to receipt of a null data packet with an indication of the undelivered fragments.

Another embodiment comprises an apparatus to acknowledge delivery of fragments of a frame. The apparatus may comprise memory; and medium access control logic coupled with the memory to receive two or more sets of up to X data packets, each data packet to comprise a different fragment of N fragments of the frame, wherein X is a number of fragments that does not exceed a capacity of a bitmap in a Null Data Packet block acknowledgement to acknowledge delivery of up to X different fragments of the N fragments and wherein X is less than N; to generate a sequence of bits in response to receiving each set of up to X data packets, wherein each bit in the sequence corresponds to delivery of a different fragment of the N fragments of the frame; and to transmit null data packet block acknowledgements in response to receipt of sets of the two or more sets of up to X data packets, wherein each null data packet block acknowledgement comprises a bitmap comprising the sequence of bits.

In some embodiments, the medium access control logic to receive retransmitted data packets for undelivered fragments identified in a bitmap of a Null Data Packet block acknowledgement prior to receipt of a subsequent set of up to X data packets. In some embodiments, the medium access control logic comprises logic to set a bit in the sequence in response to successful delivery of a different fragment, wherein a bit number of the bit in the sequence corresponds to a fragment index of the different fragment. In some embodiments, the medium access control logic comprises logic to set bit number (fragment index mod X) of a bitmap of a null data packet block acknowledgement to indicate successful reception of a fragment identified by the fragment index.

Another embodiment comprises one or more tangible computer-readable non-transitory storage media comprising computer-executable instructions operable to, when executed by at least one computer processor, enable the at least one computer processor to implement a method comprising instructions to be executed by a processor-based device, wherein the instructions, when executed by the processor-based device, perform operations, the operations may comprise receiving two or more sets of up to X data packets, each data packet to comprise a different fragment of N fragments of the frame, wherein X is a number of fragments that does not exceed a capacity of a bitmap in a Null Data Packet block acknowledgement to acknowledge delivery of up to X different fragments of the N fragments and wherein X is less than N; generating a sequence of bits in response to receiving each set of up to X data packets, wherein each bit in the sequence corresponds to delivery of a different fragment of the N fragments of the frame; and transmitting null data packet block acknowledgements in response to receiving sets of the two or more sets of up to X data packets, wherein each null data packet block acknowledgement comprises a bitmap comprising the sequence of bits.

In some embodiments, the storage media further comprise receiving retransmitted data packets for undelivered fragments identified in a bitmap of a Null Data Packet block acknowledgement prior to receipt of a subsequent set of up to X data packets. In some embodiments, generating the sequence of bits comprises setting a bit in the sequence in response to successful delivery of a different fragment, wherein a bit number of the bit in the sequence corresponds to a fragment index of the different fragment. In some embodiments, generating the sequence of bits comprises setting bit number (fragment index mod X) of a bitmap of a null data packet block acknowledgement to indicate successful reception of a fragment identified by the fragment index.

Another embodiment comprises a system to acknowledge delivery of fragments of a frame. The system may comprise a processor; a memory coupled with the processor; one or more antennas; a radio coupled with the one or more antennas to receive symbols; and logic coupled with the radio to receive two or more sets of up to X data packets, each data packet to comprise a different fragment of N fragments of the frame, wherein X is a number of fragments that does not exceed a capacity of a bitmap in a Null Data Packet block acknowledgement to acknowledge delivery of up to X different fragments of the N fragments and wherein X is less than N; to generate a sequence of bits in response to receiving each set of up to X data packets, wherein each bit in the sequence corresponds to delivery of a different fragment of the N fragments of the frame; and to transmit null data packet block acknowledgements in response to receipt of sets of the two or more sets of up to X data packets, wherein each null data packet block acknowledgement comprises a bitmap comprising the sequence of bits.

In some embodiments, the medium access control logic to receive retransmitted data packets for undelivered fragments identified in a bitmap of a Null Data Packet block acknowledgement prior to receipt of a subsequent set of up to X data packets. In some embodiments, the medium access control logic comprises logic to set a bit in the sequence in response to successful delivery of a different fragment, wherein a bit number of the bit in the sequence corresponds to a fragment index of the different fragment. In some embodiments, the medium access control logic comprises logic to set bit number (fragment index mod X) of a bitmap of a null data packet block acknowledgement to indicate successful reception of a fragment identified by the fragment index.

Another embodiment comprises a method to acknowledge delivery of fragments of a frame. The method may comprise receiving two or more sets of up to X data packets, each data packet to comprise a different fragment of N fragments of the frame, wherein X is a number of fragments that does not exceed a capacity of a bitmap in a Null Data Packet block acknowledgement to acknowledge delivery of up to X different fragments of the N fragments and wherein X is less than N; generating a sequence of bits in response to receiving each set of up to X data packets, wherein each bit in the sequence corresponds to delivery of a different fragment of the N fragments of the frame; and transmitting null data packet block acknowledgements in response to receiving sets of the two or more sets of up to X data packets, wherein each null data packet block acknowledgement comprises a bitmap comprising the sequence of bits.

In some embodiments, the method may further comprise receiving retransmitted data packets for undelivered fragments identified in a bitmap of a Null Data Packet block acknowledgement prior to receipt of a subsequent set of up to X data packets. In some embodiments, generating the sequence of bits comprises setting a bit in the sequence in response to successful delivery of a different fragment, wherein a bit number of the bit in the sequence corresponds to a fragment index of the different fragment. In some embodiments, generating the sequence of bits comprises setting bit number (fragment index mod X) of a bitmap of a null data packet block acknowledgement to indicate successful reception of a fragment identified by the fragment index.

Another embodiment comprises an apparatus to generate packets with an acknowledgement policy. The apparatus may comprise a means for determining N fragments of a frame; a means for generating at least a first set and a second set of data packets, each of the data packets comprising one of the N fragments, wherein each set comprises up to X data packets, wherein X is a number of fragments that does not exceed a capacity of a bitmap in a Null Data Packet block acknowledgement to acknowledge delivery of the number of fragments; and a means for waiting between transmission of the first set and transmission of the second set of data packets to receive acknowledgement of delivery of each of the fragments in the first set, wherein N is greater than X.

In some embodiments, the apparatus may further comprise a means for generating the symbols comprises a means for retransmitting undelivered fragments in response to receipt of a null data packet with an indication of the undelivered fragments. In some embodiments, the means for generating at least a first set and a second set of data packets comprises a means for generating each of the data packets with a unique fragment index in a Fragment number subfield of a Sequence control field. In some embodiments, the means for generating at least a first set and a second set of data packets comprises a means for generating each of the sets of data packets with a block acknowledgement policy request in all but a last data packet to transmit in each of the sets, the last data packet to transmit in each of the sets to comprise an implicit block acknowledgement policy request.

Another embodiment comprises an apparatus to acknowledge delivery of fragments of a frame. The apparatus may comprise a means for receiving two or more sets of up to X data packets, each data packet to comprise a different fragment of N fragments of the frame, wherein X is a number of fragments that does not exceed a capacity of a bitmap in a Null Data Packet block acknowledgement to acknowledge delivery of up to X different fragments of the N fragments and wherein X is less than N; a means for generating a sequence of bits in response to receiving each set of up to X data packets, wherein each bit in the sequence corresponds to delivery of a different fragment of the N fragments of the frame; and a means for transmitting null data packet block acknowledgements in response to receiving sets of the two or more sets of up to X data packets, wherein each null data packet block acknowledgement comprises a bitmap comprising the sequence of bits.

In some embodiments, the apparatus may further comprise a means for receiving retransmitted data packets for undelivered fragments identified in a bitmap of a Null Data Packet block acknowledgement prior to receipt of a subsequent set of up to X data packets. In some embodiments, the means for generating the sequence of bits comprises a means for setting a bit in the sequence in response to successful delivery of a different fragment, wherein a bit number of the bit in the sequence corresponds to a fragment index of the different fragment. In some embodiments, the means for generating the sequence of bits comprises a means for setting bit number (fragment index mod X) of a bitmap of a null data packet block acknowledgement to indicate successful reception of a fragment identified by the fragment index.

Another embodiment is implemented as a program product for implementing systems, apparatuses, and methods described with reference to FIGS. 1-4. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid-state memory like flash memory, magnetic tape, a removable computer diskette, a random access memory (RAM), a read-only memory (ROM), a rigid magnetic disk, and/or an optical disk. Current examples of optical disks include compact disk-read only memory (CD-ROM), compact disk-read/write memory (CD-R/W), digital video disk (DVD)-read only memory (DVD-ROM), DVD-random access memory (DVD-RAM), DVD-Recordable memory (DVD-R), and DVD-read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks. Modem, Bluetooth™, Ethernet, Wi-Fi, and WiDi adapter cards are just a few of the currently available types of network adapters.

What is claimed is:

1. An apparatus comprising:
   at least one processor;
   logic to generate a first bitmap for a first group of fragments of a frame, a bit of the first bitmap to indicate a receipt status for a fragment of the first group;
   logic to generate a first Null Data Packet block acknowledgement, the first Null Data Packet block acknowledgement to include the first bitmap and the first bitmap to provide receipt statuses for the first group of fragments;
   logic to generate a second bitmap for a second group of fragments of the frame, a bit of the second bitmap to indicate a receipt status for a fragment of the second group;
   logic to generate a second Null Data Packet block acknowledgement, the second Null Data Packet block acknowledgement to include the second bitmap, the second bitmap to provide receipt statuses for the second group of fragments;
   logic to select not to respond to fragments of the first and second group of fragments, which comprise an acknowledqe (Ack) policy of Block Ack;
   logic to cause transmission of the first Null Data Packet block acknowledgement a first Short Inter Frame Space (SIFS) after a fragment of the first group of fragments, which comprises an acknowledge policy of an Block Ack Request;
   logic to cause transmission of the second Null Data Packet block acknowledgement a second SIFS after a fragment of the second group of fragments, which comprises the acknowledge policy of the Implicit Block Ack Request; and
   an interface to provide communicatively coupling to at least one logic.

2. The apparatus of claim 1, wherein:
   the first bitmap is 8 bits and is to indicate receipt statuses of fragments 0-7; and
   the second bitmap is 8 bits and is to indicate receipt statuses of fragments 8-15.

3. The apparatus of claim 1, wherein the first bitmap is based on a first fragment number in the fragment of the first group of fragments, which comprises the acknowledge policy of the Implicit Block Ack Request, and the second bitmap is based on a second fragment number in the fragmnent of the second group of fragments, which comprises the acknowledge policy of the Implicit Block Ack Request.

4. The apparatus of claim 1, wherein a received fragment has an accompanying Fragment Number field in a Sequence Control Field, the Fragment Number field to indicate a fragment number.

5. The apparatus of claim 1, wherein a channel bandwidth for received fragments is 1 MHz.

6. The apparatus of claim 1, further comprising:
   a physical layer logic;
   a radio communicatively coupled to the physical layer logic; and
   at least one antenna communicatively coupled to the radio.

7. The apparatus of claim 6, further comprising:
   at least one memory communicatively coupled to the at least one processor; and
   a display communicatively coupled to the at least one processor.

8. The apparatus of claim 1, wherein at least one logic is part of a MAC sublayer processor.

9. At least one non-transitory computer-readable medium, comprising instructions stored thereon, that if executed by at least one computer, cause the least one computer to:
   generate a first bitmap for a first group of fragments of a frame, a bit of the first bitmap to indicate a receipt status for a fragment of the first group;
   generate a first Null Data Packet block acknowledgement, the first Null Data Packet block acknowledgement to include the first bitmap and the first bitmap to provide receipt statuses for the first group of fragments;
   generate a second bitmap for a second group of fragments of the frame, a bit of the second bitmap to indicate a receipt status for a fragment of the second group;
   generate a second Null Data Packet block acknowledgement, the second Null Data Packet block acknowledgement to include the second bitmap, the second bitmap to provide receipt statuses for the second group of fragments;
   select not to respond to fragments of the first and second groups of fragments, which comprise an acknowledge (Ack) policy of Block Ack;
   cause transmission of the first Null Data Packet block acknowledgement a first Short Inter Frame Space (SIFS) after a fragment of the first group of fragments, which comprises an acknowledge policy of an Implicit Block Ack Request; and cause transmission of the second Null Data Packet block acknowledgement a second SIFS after a fragment of the second group of fragments, which comprises the acknowledge policy of the Implicit Block Ack Request.

10. The at least one non-transitory computer-readable medium of claim 9, wherein:

the first bitmap is 8 bits and is to indicate receipt statuses of fragments 0-7; and the second bitmap is 8 bits and is to indicate receipt statuses of fragments 8-15.

11. The at least one non-transitory computer-readable medium of claim 9, wherein the first bitmap is based on a first fragment number in the fragment of the first group of fragments, which comprises the acknowledge policy of the Implicit Block Ack Request, and the second bitmap is based on a second fragment number in the fragment of the second group of fragments, which comprises the acknowledge policy of the Implicit Block Ack Request.

12. The at least one non-transitory computer-readable medium of claim 9, wherein:

a received fragment has an accompanying Fragment Number field in a Sequence Control Field, the Fragment Number field to indicate a fragment number.

13. A computer-implemented method, comprising:

generating a first bitmap for a first group of fragments of a frame, a bit of the first bitmap to indicate a receipt status for a fragment of the first group;

generating a first Null Data Packet block acknowledgement, the first Null Data Packet block acknowledgement to include the first bitmap and the first bitmap to provide receipt statuses for the first group of fragments;

generating a second bitmap for a second group of fragments of the frame, a bit of the second bitmap to indicate a receipt status for a fragment of the second group;

generating a second Null Data Packet block acknowledgement, the second Null Data Packet block acknowledgement to include the second bitmap, the second bitmap to provide receipt statuses for the second group of fragments;

selecting not to respond to fragments of the first and second groups of fragments, which comprise an acknowledge (Ack) policy of Block Ack;

causing transmission of the first Null Data Packet block acknowledgement a first Short Inter Frame Space (SIFS) after a fragment of the first group of fragments, which comprises an acknowledge policy of an Implicit Block Ack Request, and causing transmission of the second Null Data Packet block acknowledgement a second SIFS after a fragment of the second group of fragments, which comprises the acknowledge policy of the Implicit Block Ack Request.

14. The method of claim 13, wherein:

the first bitmap is 8 bits and is to indicate receipt statuses of fragments 0-7; and the second bitmap is 8 bits and is to indicate receipt statuses of fragments 8-15.

15. The method of claim 13, wherein the first bitmap is based on a first fragment number in the fragment of the first group of fragments, which comprises the acknowledge policy of the Implicit Block Ack Request, and the second bitmap is based on a second fragment number in the fragment of the second group of fragments, which comprises the acknowledge policy of the Implicit Block Ack Request.

16. The method of claim 13, further comprising:

receiving a Fragment Number field in a Sequence Control Field, the Fragment Number field to indicate a fragment number.

17. The method of claim 13, wherein a channel bandwidth for received fragments is 1 MHz.

18. An apparatus comprising:

at least one processor;

logic to generate a first fragment, the first fragment to have an associated acknowledgement policy of Block-ACK to indicate to a receiving device not to respond to the first fragment, the first fragment within a first group of fragments of a frame;

logic to generate a second fragment, the second fragment to have an associated acknowledgement policy of Implicit BlockACK to request the receiving device to respond with a first Null Data Packet block acknowledgement a first Short Inter Frame Space (SIFS) after the second fragment, the second fragment comprising a fragment after the first fragment in the first group;

logic to generate a third fragment, the third fragment to have an associated acknowledgement policy of Block-ACK to indicate to the receiving device not to respond to the third fragment, the third fragment within a second group of fragments of the frame, the second group of fragments subsequent to the first group of fragments;

logic to generate a fourth fragment, the fourth fragment to have an associated acknowledgement policy of Implicit BlockACK to request the receiving device to respond with a second Null Data Packet block acknowledgement a second SIFS after the fourth fragment, the fourth fragment comprising a fragment after the third fragment in the second group; and an interface to provide communicatively coupling to at least one logic.

19. The apparatus of claim 18, wherein:

in response to {(fragment number+1) mod 8} is not 0 and a fragment is not a last fragment in a group, then such fragment is to have an associated acknowledgement policy of BlockACK;

in response to {(fragment number+1) mod 8} is 0 or if this is the last fragment in a group, then such fragment to have an associated acknowledgement policy of Implicit BlockACK; and a fragment number associated with a first bit in a first or second bitmap is determined by: floor (fragment number of the last transmitted fragmented frame/8).

20. The apparatus of claim 18, further comprising:

logic to provide a Fragment Number field in a Sequence Control Field with the first fragment, the Fragment Number field to indicate a fragment number of the first fragment.

21. The apparatus of claim 18, comprising:

logic to receive a first bitmap in the first Null Data Packet block acknowledgement, the first bitmap to provide receipt statuses for the first group of fragments;

logic to determine a fragment of the first group to re-transmit based at least in part on a receipt status in the first bitmap, wherein a bit location in the first bitmap is associated with a transmitted fragment of the first group, the fragment of the first group to re-transmit is based on bit location;

logic to receive a second bitmap in the second Null Data Packet block acknowledgement, the second bitmap to provide receipt statuses for the second group of fragments; and logic to determine a fragment of the second group to re-transmit based at least in part on an acknowledgment status in the second bitmap, wherein a bit location in the second bitmap is associated with a transmitted fragment of the second group, the fragment of the second group to re-transmit based on bit location.

22. The apparatus of claim 21, wherein:
the first bitmap is 8 bits and is to indicate receipt statuses of fragments 0-7; and
the second bitmap is 8 bits and is to indicate receipt statuses of fragments 8-15.

23. The apparatus of claim 18, wherein a channel bandwidth for transmitted fragments is 1 MHz.

24. At least one non-transitory computer-readable medium, comprising instructions stored thereon, that if executed by at least one computer, cause the least one computer to:
generate a first fragment, the first fragment to have an associated acknowledgement policy of BlockACK to indicate to a receiving device not to respond to the first fragment, the first fragment within a first group of fragments of a frame;
generate a second fragment, the second fragment to have an associated acknowledgement policy of Implicit BlockACK to request the receiving device to respond with a first Null Data Packet block acknowledgement a first Short Inter Frame Space (SIFS) after the second fragment, the second fragment comprising a fragment after the first fragment in the first group;
generate a third fragment, the third fragment to have an associated acknowledgement policy of BlockACK to indicate to the receiving device not to respond to the third fragment, the third fragment within a second group of fragments of the frame, the second group of fragments subsequet to the first group of fragments; and
generate a fourth fragment, the fourth fragment to have an associated acknowledgement policy of Implicit BlockACK to request the receiving device to respond with a second Null Data Packet block acknowledgement a second SIFS after the fourth fragment, the fourth fragment comprising a fragment after the third fragment in the second group.

25. The at least one non-transitory computer-readable medium of claim 24, further comprising instructions stored thereon, that if executed by at least one computer, cause the least one computer to:
in response to {(fragment number+1) mod 8} is not 0 and a fragment is not a last fragment in a group, set an associated acknowledgement policy of BlockACK for such fragment;
in response to {(fragment number+1) mod 8} is 0 or if this is the last fragment in a group, set an associated acknowledgement policy of Implicit BlockACK for such fragment; and
determine a fragment number associated with a first bit in a first or second bitmap by: floor (fragment number of the last transmitted fragmented frame/8).

26. The at least one non-transitory computer-readable medium of claim 24, further comprising instructions stored thereon, that if executed by at least one computer, cause the least one computer to:
provide a Fragment Number field in a Sequence Control Field with the first fragment, the Fragment Number field to indicate a fragment number of the first fragment.

27. The at least one non-transitory computer-readable medium of claim 24, further comprising instructions stored thereon, that if executed by at least one computer, cause the least one computer to:
receive a first bitmap in the first Null Data Packet block acknowledgement, the first bitmap to provide receipt statuses for the first group of fragments;
determine a fragment of the first group to re-transmit based at least in part on a receipt status in the first bitmap, wherein a bit location in the first bitmap is associated with a transmitted fragment of the first group, the fragment of the first group to re-transmit is based on bit location;
receive second bitmap in the second Null Data Packet block acknowledgement, the second bitmap to provide receipt statuses for the second group of fragments; and
determine a fragment of the second group to re-transmit based at least in part on an acknowledgment status in the second bitmap, wherein a bit location in the second bitmap is associated with a transmitted fragment of the second group, the fragment of the second group to re-transmit is based on bit location.

28. The at least one non-transitory computer-readable medium of claim 24, wherein:
the first bitmap is 8 bits and is to indicate receipt statuses of fragments 0-7; and
the second bitmap is 8 bits and is to indicate receipt statuses of fragments 8-15.

29. A computer-implemented method comprising:
generating a first fragment, the first fragment to have an associated acknowledgement policy of BlockACK to indicate to a receiving device not to respond to the first fragment, the first fragment within a first group of fragments of a frame;
generating a second fragment, the second fragment to have an associated acknowledgement policy of Implicit BlockACK to request the receiving device to respond with a first Null Data Packet block acknowledgement a first Short Inter Frame Space (SIFS) after the second fragment, the second fragment comprising a fragment after the first fragment in the first group;
generating a third fragment, the third fragment to have an associated acknowledgement policy of BlockACK to indicate to the receiving device not to respond to the third fragment, the third fragment within a second group of fragments of the frame, the second group of fragments subsequent to the first group of fragments; and
generating a fourth fragment, the fourth fragment to have an associated acknowledgement policy of Implicit BlockACK to request the receiving device to respond with a second Null Data Packet block acknowledgement a second SIFS after the fourth fragment, the fourth fragment comprising a fragment after the third fragment in the second group.

30. The method of claim 29, further comprising:
in response to {(fragment number+1) mod 8} is not 0 and a fragment is not a last fragment in a group, setting an associated acknowledgement policy of BlockACK for such fragment;
in response to {(fragment number+1) mod 8} is 0 or if this is the last fragment in a group, setting an associated acknowledgement policy of Implicit BlockACK for such fragment; and
determining a fragment number associated with a first bit in a first or second bitmap by: floor (fragment number of the last transmitted fragmented frame/8).

31. The method of claim 29, further comprising:
providing a Fragment Number field in a Sequence Control Field with the first fragment, the Fragment Number field to indicate a fragment number of the first fragment.

32. The method of claim 29, comprising:
receiving a first bitmap in the first Null Data Packet block acknowledgement, the first bitmap to provide receipt statuses for the first group of fragments;
determining a fragment of the first group to re-transmit based at least in part on a receipt status in the first bitmap, wherein a bit location in the first bitmap is associated with a transmitted fragment of the first group, the fragment of the first group to re-transmit is based on bit location;
receiving a second bitmap in the second Null Data Packet block acknowledgement, the second bitmap to provide receipt statuses for the second group of fragments; and
determining a fragment of the second group to re-transmit based at least in part on an acknowledgment status in the second bitmap, wherein a bit location in the second bitmap is associated with a transmitted fragment of the second group, the fragment of the second group to re-transmit is based on bit location.

33. The method of claim 32, wherein:
the first bitmap is 8 bits and is to indicate receipt statuses of fragments 0-7; and
the second bitmap is 8 bits and is to indicate receipt statuses of fragments 8-15.

* * * * *

UNITED STATES PATENT AND TRADEMARK OFFICE
CERTIFICATE OF CORRECTION

PATENT NO. : 9,479,246 B2  
APPLICATION NO. : 14/142790  
DATED : October 25, 2016  
INVENTOR(S) : Minyoung Park Page 1 of 1

It is certified that error appears in the above-identified patent and that said Letters Patent is hereby corrected as shown below:

In the Claims

In Column 23, Line 66, in Claim 1, delete "group" and insert -- groups --, therefor.

In Column 24, Line 4, in Claim 1, delete "an block" and insert -- an implicit Block --, therefor.

In Column 28, Line 14, in Claim 27, delete "receive second bitmap" and insert -- receive a second bitmap --, therefor.

In Column 28, Line 24, in Claim 28, delete "medium of claim 24" and insert -- medium of claim 27 --, therefor.

Signed and Sealed this  
Thirty-first Day of January, 2017

Michelle K. Lee  
*Director of the United States Patent and Trademark Office*